3,280,086
METHOD FOR PRODUCING POLYMERS USING REDOX SYSTEMS AT pH VALUES OF 4 TO 5
Akira Nakajima, Kenji Takeya, and Masanobu Hoten, Saidaiji, Japan, assignors to Japan Exlan Company Limited, Kita-ku, Osaka, Japan
No Drawing. Filed Feb. 24, 1964, Ser. No. 347,043
Claims priority, application Japan, Feb. 27, 1963, 38/9,817
5 Claims. (Cl. 260—85.5)

This invention relates to a novel method for producing polymers. More particularly, the invention relates to a process for producing polymers by using a certain novel catalyst or polymerization initiator.

The polymerization of an unsaturated compound containing ethylenic double bonds is generally conducted in the presence of a catalyst which is a substance capable of releasing free radicals, such as peroxides and azo compounds (which are sometimes referred to as polymerization initiators), but for such formation of free radicals, it is necessary that the reaction be conducted at elevated temperatures. Therefore, the resulting polymer will not only be discolored but also have various other defects. Furthermore, due to the high temperature there occurs undesirable evaporation of monomer(s).

The above considerations then led to the development of redox catalysts which readily liberate free radicals at a lower temperature. When such a redox catalyst is employed, oxidation and reduction reactions take place simultaneously, in which the oxidizing and reducing agents contained in the catalyst participate. Examples of the redox catalysts are a combination of an oxygen-liberating catalyst, such as a persulfate, and a sulfoxy compound as described in U.S. Patent No. 2,462,354 of February 22, 1949 and a combination of a chlorate ion donor and a sulfite ion donor as disclosed in U.S. Patent No. 2,673,192 of March 23, 1954 and U.S. Patent No. 2,751,374 of June 19, 1956.

From the observation that phosphorous or phosphite ions have reducing properties, we have made various studies and have found that when said ions are used in combination with a water-soluble peroxide, very satisfactory polymers are produced.

Thus, this invention relates to a process for polymerizing or copolymerizing ethylenically unsaturated compounds having ethylenic double bonds, characterized in that phosphorous acid or its water-soluble salt is used in conjunction with a water-soluble peroxide as polymerization catalyst.

The said compounds having ethylenic double bonds, to which the present invention may be applied with advantage, include, for instance, acrylonitrile, methacrylonitrile; such methacrylic acid esters as methyl methacrylate, ethyl methacrylate, butyl methacrylate, etc.; such acrylic acid esters as methyl acrylate, ethyl acrylate, butyl acrylate, etc.; various acrylamides and methacrylamides including their alkyl substitutes; such unsaturated ketones as methylvinyl ketone, phenylvinyl ketone, etc.; such vinyl carboxylates as vinyl formate, vinyl acetate, vinyl benzoate, etc.; maleic acid, fumalic acid, and itaconic acid as well as various esters thereof; acrylic acid, vinyl ether, N-vinyl carbazol, N-vinyl-succinimide, N-vinylphthalimide; such vinyl pyridines as 2-vinyl pyridine, 4-vinyl pyridine, 2-methyl-5-vinyl pyridine, etc., and styrene.

The aforementioned water-soluble peroxide which may be employed in this invention include any and all water soluble peroxide catalysts heretofore known to those skilled in the art of polymerization, such as water-soluble persulfate, perborate, hydrogen peroxide, benzoyl peroxide, diethyl peroxide, perphosphate, etc.

While these peroxide catalysts may ordinarily be used within the range of 0.5 to 20 percent based on the monomer used, it is necessary to select the proper amount according to the particular polymerizing conditions such as the kind of the monomer used, the desired degree of polymerization, the desired molecular weight of the final polymer, the molar ratio of the reducing agent used, i.e. phosphorous acid or its water-soluble salt, the polymerization temperature, and the pH of the aqueous medium in which the polymerization reaction is conducted.

The water-soluble phosphite which is employed as a reducing agent according to this invention may be exemplified by sodium phosphite, potassium phosphite, ammonium phosphite, and the like. The said phosphite may be employed in a molar ratio of more than 0.2 mole based on the water-soluble peroxide catalyst used, and, preferably, in a ratio of 1 to 20 moles on the same basis under ordinary conditions.

Except for the requirement that the aforesaid particular novel catalyst system be employed, any conventional polymerization process may be used for the polymerization (or copolymerization) of unsaturated ethylenic compounds containing double bonds in aqueous media. For example, a reaction vessel furnished with an efficient agitator is charged with water and a monomer or a mixture of monomers. If required, a suitable dispersing agent or emulsifier may be added at the same time. After the monomer is dissolved or dispersed in the water, the reaction vessel is closed, and the air in the space above the solution is replaced with an inert gas such as nitrogen or carbon dioxide. The reaction mixture is then adjusted to a suitable temperature which may range from 0° C. to about 100° C. After the reaction mixture attains the desired temperature, the polymerization reaction is initiated by adding thereto said catalyst, i.e. a peroxide and a phosphorous acid or its water-soluble salt. Usually, the poymerization reaction goes to near completion in about several hours to tens of hours. The resulting mixture is then transferred to a suitable open vessel, in which any unreacted monomer is removed. The polymerized product is then solidified, e.g. by adding thereto a solution of a suitable electrolyte such as aluminum sulfate. If necessary, the dispersion containing said polymerized product may be solidified under freezing conditions. The solidified product is filtered, and the impurities and any trace of the residual dispersant are removed by washing the product thoroughly with water. Lastly, the product is dried.

The term "aqueous medium" as used throughout this specification is intended to include a concentrated aqueous solution of such inorganic salts as rhodanates, lithium bromide, zinc chloride, aluminum perchlorate, etc., and such inorganic acids as nitric acid etc. For example, where acrylonitrile is polymerized according to this invention in a concentrated aqueous solution of a rhodanate, e.g. sodium rhodanate, the resulting polymer will be obtained in the form of a solution. Such a solution may be directly extruded through a spinnerette nozzle into filaments, instead of separating the polymer from the aqueous medium beforehand.

According to this invention, the polymerization rate is increased and there is obtained a polymer or copolymer having any desired molecular weight and which is excellent in whiteness and has good affinity with basic dyes. Therefore, the polymer or copolymer obtained according to this invention is useful as forming into fibers. Further advantage of this invention is that the polymerization can be conducted at a lower temperature.

The invention will be described in more detail by referring to the following examples which are given by way of illustration and not for limitation of the invention. Throughout the examples all parts are by weight.

Example 1

A reaction vessel having an agitator was charged with 1400 parts of deionized water, 90 parts of acrylonitrile, and 10 parts of methyl acrylate, and the monomers were thoroughly dissolved in the water. With the temperature within the reaction vessel held at 60° C., the air was replaced with nitrogen gas. As shown in Table 1, hydrogen peroxide and sodium phosphite ($Na_2HPO_3$) were then added to the mixture. The hydrogen ion concentration (pH) of the reaction system was adjusted with nitric acid before the polymerization reaction was initiated. Table 1 shows the induction period before the polymerization was initiated and also, the yield and the average molecular weight of the resultant copolymer after 4 hours polymerization.

TABLE 1

| No. | Hydrogen peroxide (parts) | Sodium phosphite (parts) | pH | Induction period (min.) | Yield of polymer | Average molecular weight of polymer |
|---|---|---|---|---|---|---|
| 1 | 7 | none | 4 | 128 | 6.3 | 107,000 |
| 2 | 7 | 26 | 4 | 80 | 26.3 | 134,000 |
| 3 | 7 | 52 | 4 | 73 | 24.0 | 135,000 |
| 4 | 7 | 104 | 4 | 60 | 52.6 | 111,000 |
| 5 | 7 | 155 | 4 | 43 | 61.8 | 116,000 |
| 6 | 7 | 208 | 4 | 15 | 58.7 | 122,000 |
| 7 | 7 | none | 5 | 145 | 25.0 | 121,000 |
| 8 | 7 | 104 | 5 | 88 | 79.8 | 74,700 |
| 9 | 7 | 155 | 5 | 6 | 83.2 | 68,000 |
| 10 | 7 | 202 | 5 | 7 | 85.8 | 84,400 |

It is apparent from Table 1 that, as compared with the cases in which hydrogen peroxide alone is employed, the polymerization reaction is accelerated by the presence of sodium phosphite.

For comparison, the results of an experiment in which the same polymerization reaction as above was conducted with the exception of the use of a catayst comprised of hydrogen peroxide and sodium hypophosphite ($NaH_2PO_2$) are summarized in Table 2.

TABLE 2

| Hydrogen peroxide (parts) | Sodium hypophosphate (parts) | pH | Induction period (min.) | Yield of polymer | Average molecular weight of polymer |
|---|---|---|---|---|---|
| 6 | 124 | 5 | 32 | 40.2 | 78,500 |
| 9 | 186 | 5 | 12 | 54.4 | 59,400 |

Example 2

A reaction vessel furnished with an agitator was charged with 1300 parts of deionized water and 100 parts of acrylonitrile, and the latter was dissolved in the former. After the air was replaced with nitrogen gas, and with the temperature held at 55° C., 254 parts of sodium phosphite ($Na_2HPO_3 \cdot H_2O$) and 16.7 parts of a 30% aqueous solution of hydrogen peroxide were added to the solution. The solution was then adjusted to ph 5.0 with sulfuric acid, and subjected to polymerization for 4 hours, at the end of which time 84.4 parts of an acrylonitrile polymer was obtained. Having an average molecular weight of 79,000, the polymer was suitable for the production of textile fibers. On the other hand, the polymer produced in the absence of sodium phosphite had an exceptionally high molecular weight and, accordingly, was unsuitable for the production of textile fibers.

Example 3

Using a reaction vessel furnished with an agitator 88 parts of acrylonitrile and 12 parts of vinyl acetate were dissolved in 1400 parts of deionized water. After the air within the vessel was replaced with nitrogen gas, and with the solution temperature held at 57° C., 30 parts of a 30% aqueous solution of hydrogen peroxide and 212 parts of ammonium phosphite ($(NH_4)_2HPO_3 \cdot H_2O$) were added to the solution. The solution was then adjusted to pH 5.0 with nitric acid. In 6 minutes, the monomers began to undergo a polymerization, with the solution starting to show a white turbidity. After 4 hours' reaction, the slurry was withdrawn from the vessel and poured into cold water. After a filtration, washing, dehydration and drying, 86.2 parts of a powdery polymer was obtained. Having an average molecular weight of 75,000, the polymer was useful for the production of textile fibers. The above powdery polymer was thoroughly ground in a ball mill, and dyed at 100° C. for 60 minutes with a solution of 20% by weight (relative to the polymer) of basic dyestuff Cebron Blue 5G at pH 5 (adjusted with acetic acid) (bath ratio 1:100). The exhaustion of the dye was 31.1%. On the other hand, the polymer which was similarly obtained but in the absence of sodium phosphite had a substantially low affinity for basic dyestuffs.

Example 4

In a reaction vessel furnished with an agitator, 91.2 parts of acrylonitrile and 8.8 parts of methyl methacrylate were dissolved in 1400 parts of deionized water. After the air within the vessel was replaced with nitrogen gas, and with the temperature held at 60° C., 7 parts of potassium persulfate and 45 parts of sodium phosphite ($Na_2HPO_3 \cdot 5H_2O$) were added to the solution, which was then adjusted to pH 4.5 with nitric acid. After 2 hours' reaction, 83 parts of a copolymer was obtained. Having an average molecular weight of 85,000, the copolymer was useful for the production of textile fibers.

Example 5

Using 100 parts of methyl acrylate and 1 part of sodium laurylsulfate instead of 100 parts of acrylonitrile, 65 parts of a polymer was obtained in the same manner as Example 2.

What we claim is:

1. In a process for producing a homopolymer of acrylonitrile and a copolymer of acrylonitrile and at least one member selected from the group consisting of methyl acrylate, vinyl acetate and methyl methacrylate, the polymerization being conducted in an equeous medium the improvement which comprises conducting the polymerization at a pH of between 4 and 5 and in a catalyst system consisting essentially of about 0.5 to 20%, based on the weight of the monomer, of a water soluble oxygen liberating compound and more than 0.2 moles, based on said oyxgen liberating compound, of an inorganic phosphorous compound selected from the group consisting of phosphorous acid and water soluble salts thereof.

2. A process as claimed in claim 1 wherein the oxygen-liberating compound is hydrogen peroxide.

3. A process as claimed in claim 1 wherein the oxygen-liberating compound is selected from the group consisting of water soluble persulfate, perborate, benzoyl peroxide, diethyl peroxide and perphosphate.

4. A process as claimed in claim 1 wherein the inorganic phosphorous compound is selected from the group consisting of sodium phosphite, potassium phosphite and ammonium phosphite.

5. A process as claimed in claim 1 wherein the amount of inorganic phosphorous compound is from 1 to 20 moles based on the water-soluble, oxygen-liberating compound.

References Cited by the Examiner

UNITED STATES PATENTS 2,543,635  2/1951  Loritsch _____ 260—88.7
2,629,712  2/1953  Stanin et al. _____ 260—88.7

JOSEPH L. SCHOFER, *Primary Examiner.*

H. WONG, *Assistant Examiner.*